United States Patent [19]

Anderson et al.

[11] Patent Number: 4,549,501
[45] Date of Patent: Oct. 29, 1985

[54] ANIMAL HEAD RESTRAINER

[75] Inventors: Lloyd L. Anderson; Leon E. Girard, both of Ames, Iowa

[73] Assignee: Iowa State University Research Foundation, Inc., Ames, Iowa

[21] Appl. No.: 611,174

[22] Filed: May 17, 1984

[51] Int. Cl.⁴ .............................................. A01K 1/06
[52] U.S. Cl. ...................................... 119/99; 119/102
[58] Field of Search ..................... 119/96, 98, 99, 103, 119/102

[56] References Cited

U.S. PATENT DOCUMENTS

| | | | |
|---|---|---|---|
| 2,438,322 | 3/1948 | McDonough | 119/99 |
| 2,452,816 | 11/1948 | Wagner | 269/328 |
| 3,092,871 | 6/1963 | Marshall et al. | 119/103 X |
| 3,250,252 | 5/1966 | Leopold | 119/103 |
| 3,542,030 | 11/1970 | Hoffman | 119/103 X |
| 4,033,339 | 7/1977 | Roberts | 269/328 |
| 4,064,401 | 12/1977 | Marden | 269/328 |
| 4,357,906 | 11/1982 | Kratky | 119/98 |

Primary Examiner—Hugh R. Chamblee
Attorney, Agent, or Firm—Zarley, McKee, Thomte, Voorhees & Sease

[57] ABSTRACT

An animal head restrainer for holding the head of an animal confined in an animal chute is provided and includes a pair of bracket assemblies adjustably attached to the chute and a head cradle connected to the bracket assemblies. The cradle includes a crossbar adjustably connected at opposite ends to the bracket assemblies, a clamp unit pivotally attached to the crossbar intermediate the ends thereof, a pair of spaced apart arms connected to and extending forwardly from the clamp unit, and a jaw support member slidably mounted upon the arms. The head restrainer permits the head of the animal to be raised, lowered, tilted and turned to the desired position for work thereon.

20 Claims, 9 Drawing Figures

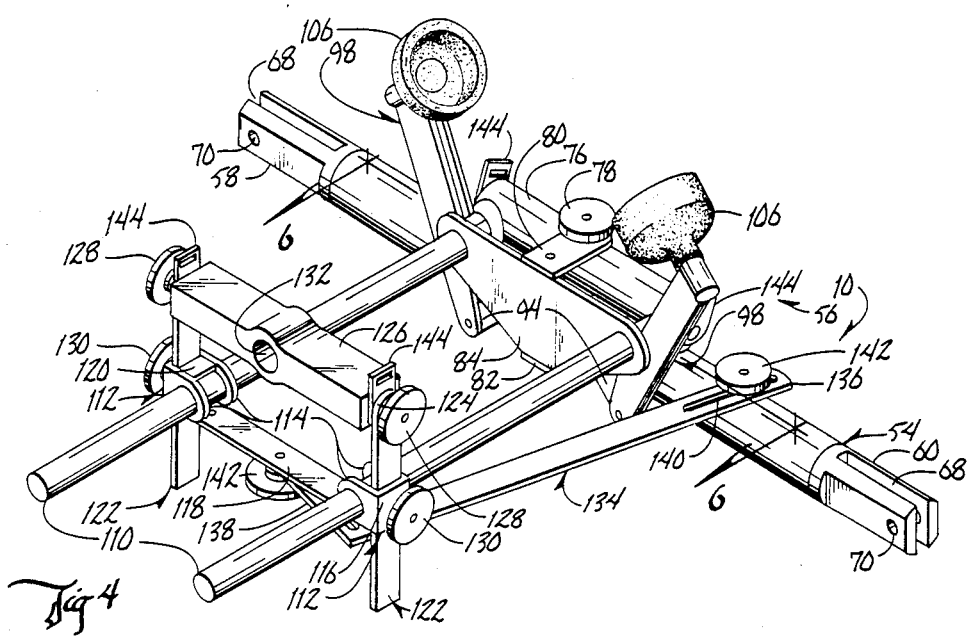
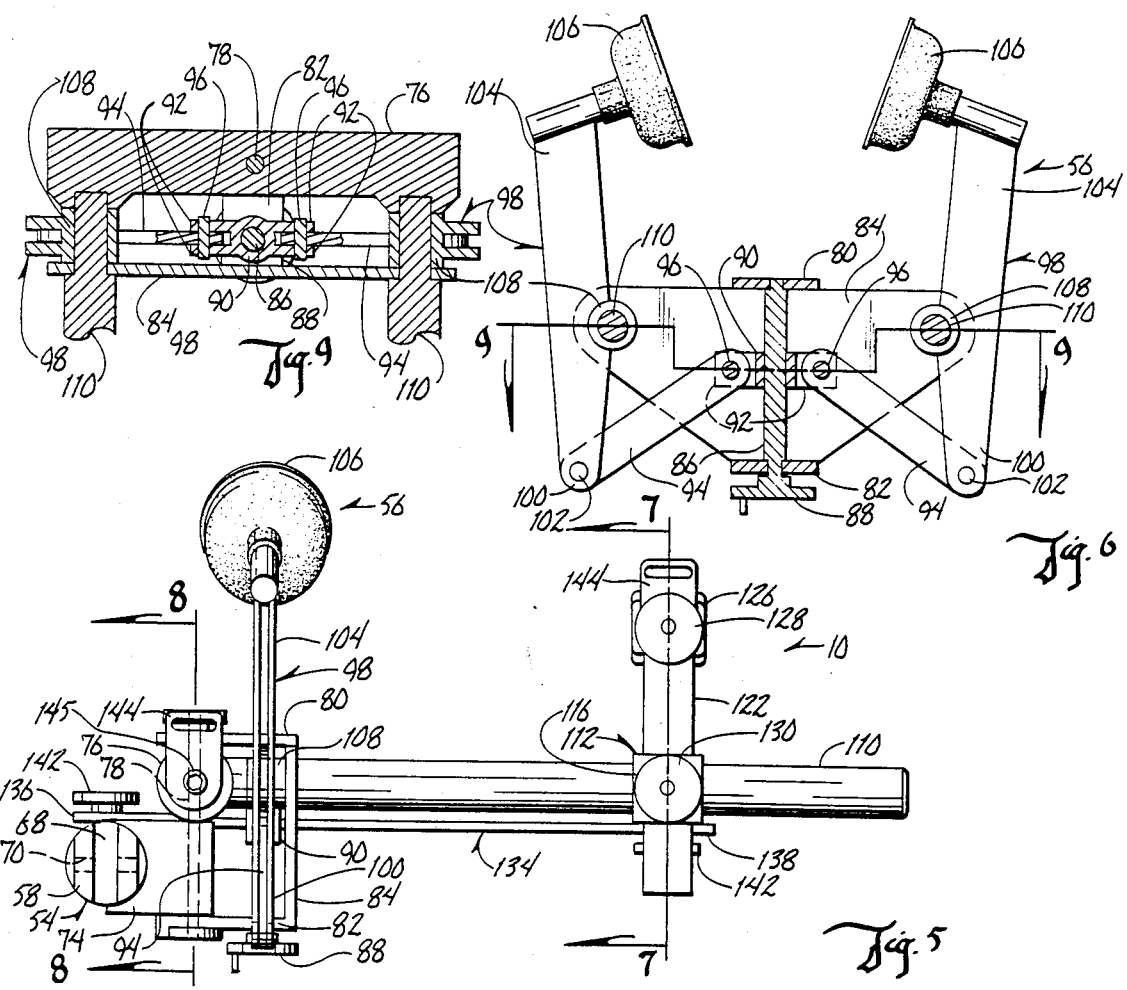

4,549,501

ANIMAL HEAD RESTRAINER

BACKGROUND OF THE INVENTION

Various devices have been used in the past to hold the head of a person or animal in position while work is being performed thereon. Most previous head restraint devices permit some maneuverability of the head, though such manipulation has been limited to one or two directions without permitting freedom of movement in several directions simultaneously. Generally, it is desirable to be able to move the head upwardly and downwardly, to turn the head from one side to another, and to tilt the head from one side to another so as to permit the head to be properly presented for the work to be performed thereon.

Therefore, a primary objective of the present invention is the provision of an improved head restrainer in which the head of an animal can be manipulated in various directions.

A futher objective of the present invention is the provision of an animal head restrainer in which the head can be raised and lowered, as well as turned and tilted from one side to another.

Another objective of the present invention is the provision of an animal head restrainer which will accommodate animals of various sizes.

A further objective of the present invention is the provision of an animal head restrainer which will support the head of an animal while the animal is anesthetized.

A still further objective of the present invention is the provision of an animal head restrainer which permits easy manipulation of the head into the desired position for work thereon.

These and other objectives will become apparent from the detailed description of the animal head restrainer.

SUMMARY OF THE INVENTION

The animal head restrainer device of the present invention is used in conjunction with an animal chute or frame which confines the body of the animal. The chute has an opening in the forward end through which the head of the animal extends. A head cradle for holding the head of an animal is mounted upon a pair of bracket assemblies connected to the animal chute. The cradle generally includes a crossbar which is adjustably connected at opposite ends thereof to the bracket assemblies such that the cradle is pivotable about a horizontal axis, thus permitting the head of the animal to be tilted from one side to another, as well as to be raised or lowered to the desired elevation. A head clamp unit is attached to the crossbar such that the clamp unit is pivotable about a vertical axis, thus permitting the head of the animal to be turned from side to side. A pair of spaced apart arms extends forwardly from the head clamp unit and has a jaw support member slidably mounted thereon. Screws, bolts, and/or pins are used to maintain the head cradle in the desired position. Straps can be attached to the restrainer to further secure the animal's head thereon.

BRIEF DESCRIPTION OF THE DRAWINGS

FIG. 4 is a perspective view of the head restrainer of the present invention.

FIG. 5 is a side elevational view of the head restrainer.

FIG. 6 is a view taken along line 6—6 of FIG. 4.

FIG. 9 is a view taken along line 9—9 of FIG. 6.

DETAILED DESCRIPTION OF THE DRAWINGS

Figure 1:
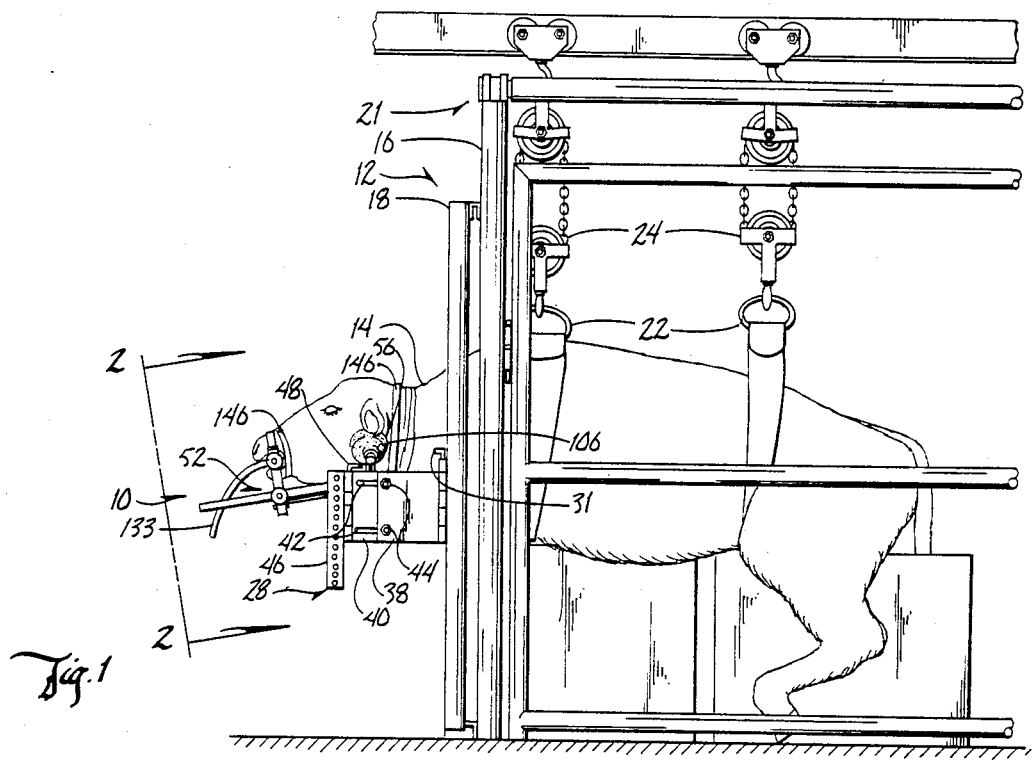
FIG. 1 is a side elevational view showing an animal in an animal chute with the head of the animal supported in the head restrainer device of the present invention.

The animal head restrainer of the present invention is generally designated by the reference numeral 10. Restrainer 10 is used in conjunction with an elongated animal chute 12 or other framework designed to confine the body of an animal 14. Chute 12 is of conventional construction and generally has a front end 16 with upright posts 18 which are spaced apart from one another so as to define an opening 20 therebetween through which the head of the animal extends. Chute 12 may also include an upper framework 21 extending rearwardly from front end 16, slings 22, and hoists 24 for supporting the animal's body as needed.

A pair of bracket assemblies 26 and 28 are connected to chute 12 in any convenient manner, such as by pins 30 and 31, respectively. Bracket assembly 26 includes first and second bar elements 32 and 34, respectively. Bar 32 is hingedly connected to chute 12 by pin 30 and has a plurality of holes 36 extending therethrough. Bar 34 is connected to bar 32 in any convenient manner such as by nut and bolt assemblies extending through one of holes 36, such that the vertical position of bar 34 with respect to bar 32 is selectively adjustable.

Bracket assembly 28 includes a first plate 38 hingedly secured to chute 12 by pin 31 and a second plate 40 having slots 42 therein. Nut and bolt assemblies 44 extend through aligned holes in plate 38, through slots 42 and through plate 40 such that plate 40 is slidably positioned with respect to plate 38. An elongated bar 46 is also hingedly attached to plate 40 at the end thereof opposite plate 38 by pin 48 or the like. Bar 46 has a plurality of holes 50 extending along the length thereof.

A head cradle 52 is provided which includes a crossbar 54 and a clamp unit 56. Crossbar 54 has opposite ends 58 and 60 which are detachably secured to bars 34 and 46 in any convenient manner. For example, in FIG. 2, end 58 of crossbar 54 is shown as being connected to one of a plurality of holes 62 in bar 34 by a pin 64 while end 60 is bolted to a connecting member 66, which in turn is selectively bolted to at least one of the holes 50 in bar 46. More particularly, ends 58 and 60 have a slot 68 therein adapted to receive bar 34 and connecting member 66, respectively. Each end of crossbar 54 also has a hole 70 extending therethrough for receiving pin 64 or bolt 72, respectively, or the like for securing the end to the respective bracket assembly.

Figure 2:
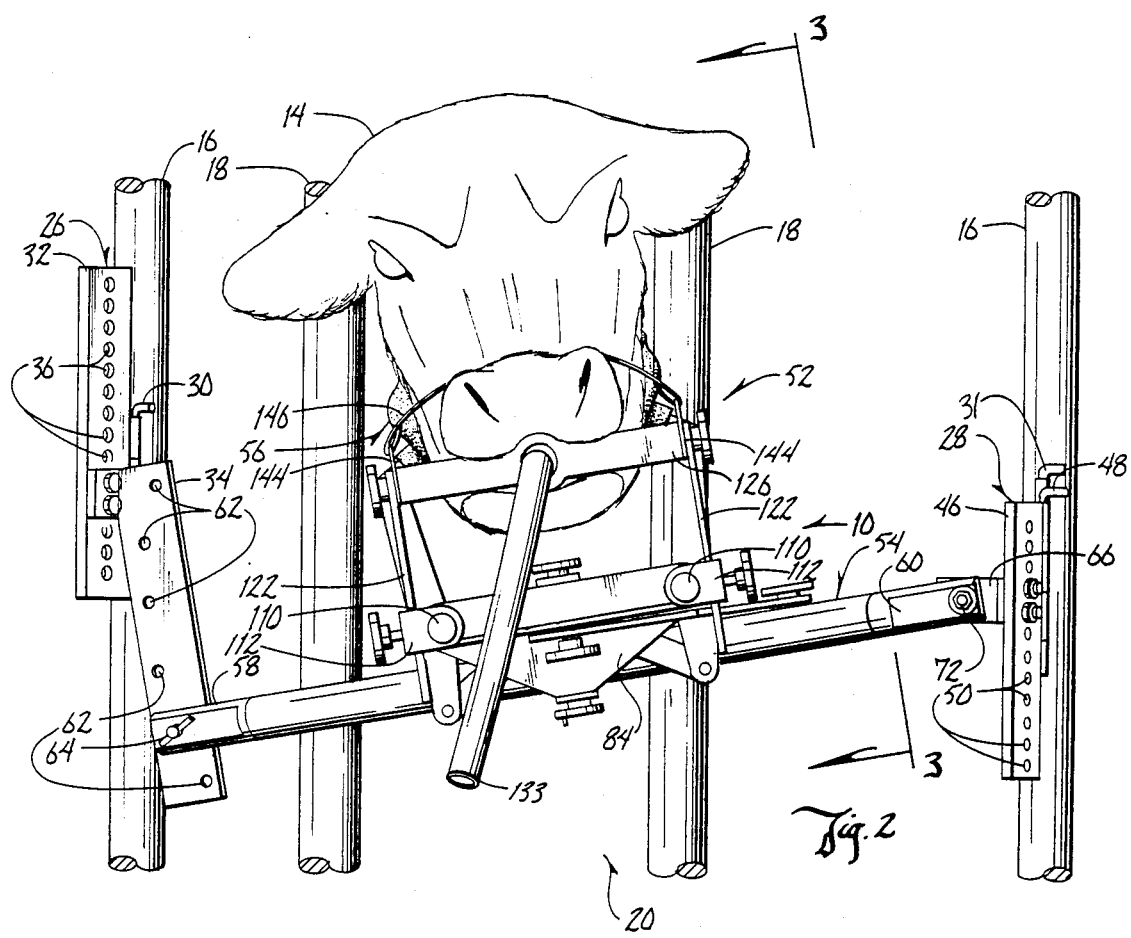
FIG. 2 is a front elevational view taken along line 2—2 of FIG. 1 with the head cradle pivoted about a horizontal axis which is parallel with the longitudinal axis of the chute.
Figure 7:
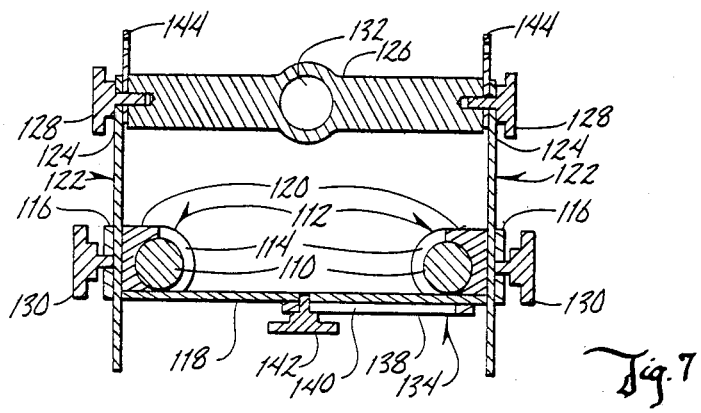
FIG. 7 is a view taken along line 7—7 of FIG. 5.
Figure 8:
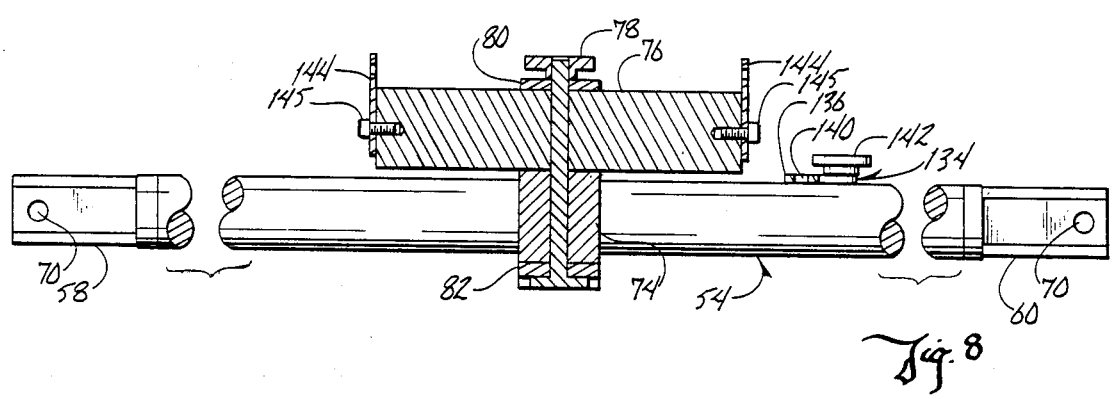
FIG. 8 is a view taken along line 8—8 of FIG. 5.
Figure 3:
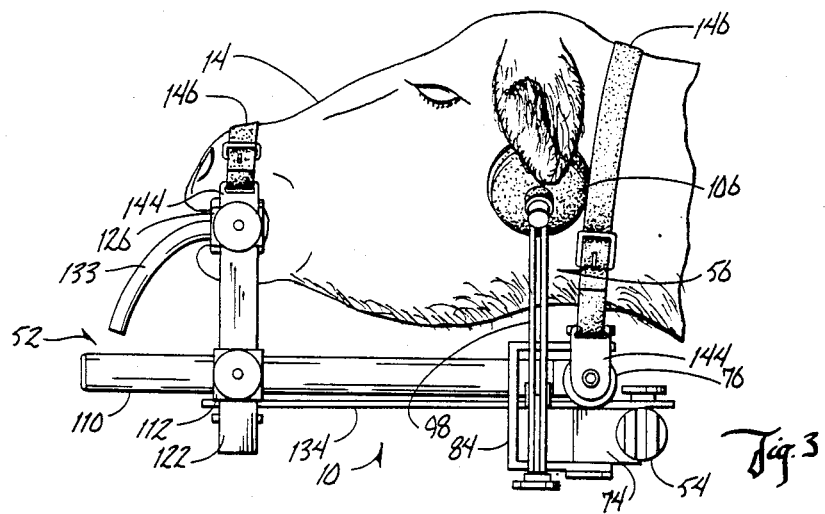
FIG. 3 is a side elevational view of the head restrainer in use.

As best seen in FIG. 2, holes 62 in bar 34 and holes 50 in bar 46 permit each end of crossbar 54 to be raised or lowered together such that cradle 52 raises or lowers the head of animal 14. Furthermore, either end of crossbar 54 can be raised or lowered alone such that cradle 52 is pivoted about a horizontal axis which is substantially parallel with the longitudinal axis of the chute, thus tilting the head of animal 14 to one side or the other.

It is understood that the precise construction of bracket assemblies 26 and 28 is variable and that such brackets may be identical to one another. The drawings show two possible constructions, one on either side of opening 20. Preferably, bracket assemblies 26 and 28 permit individual vertical positioning of crossbar 54 such that cradle 52 can be raised, lowered, or pivoted about a horizontal axis. Also, in the preferred embodiment, the spaced relation of cradle 52 with regard to chute 12 is adjustable, as by slots 42 in plate 40.

Clamp unit 56 of head cradle 52 includes a support member 74 rigidly secured to crossbar 54 at the approximate midpoint thereof. A first arm 76 is pivotally mounted upon support member 74 by an elongated bolt or pin 78 extending through support member 74 and the midpoint of arm 76 such that arm 76 is pivotable about the axis of bolt 78.

Rigidly attached to first arm 76 is an upper bracket member 80 through which screw 78 extends. A lower bracket member 82 is pivotally connected via screw 78 to support member 74. Upper and lower bracket members 80 and 82 are horizontally disposed, extend forwardly from arm 76 and support member 74, and are interconnected by an enlarged vertically disposed plate member 84. Rotatably journalled between upper and lower bracket members 80 and 82 is a threaded shaft 86 having a handle 88 at the lower end thereof for rotating the shaft. Threadably mounted upon shaft 86 is a collar 90 which has two pairs of ears 92 on opposite sides thereof. Each pair of ears 92 has a first lever arm 94 positioned therebetween and extending therefrom which is pivotally attached thereto by a pin 96. A second lever arm 98 has a lower end 100 which is pivotally attached by a pin 102 to the end of each lever arm 94 opposite pin 96. The upper end 104 of second lever arms 98 support head clamps 106 which extend towards one another for receiving the head of the animal therebetween.

Lever arms 98 each have a bushing 108 attached between the upper and lower ends thereof. Bushings 108 are each rotatably mounted upon a pair of spaced apart arms or shafts 110 attached to and extending forwardly from first arm 76 and extending through plate member 84. The pivotal connections of first lever arms 94 and second lever arms 98 permit head clamps 106 to be moved from an open position to a head engaging position. As handle 88 is turned to rotate threaded shaft 86, collar 90 moves upwardly or downwardly upon shaft 86 thus opening or closing head clamps 106 respectively. More particularly, as collar 90 moves upwardly upon shaft 86, first lever arms 94 pull lower ends 100 of second lever arms 98 inwardly as second lever arms 98 pivot on bushings 108 about shafts 110 such that the upper end 104 thereof move outwardly to open clamps 106. Conversely, as collar 90 moves downwardly upon shaft 86 in response to rotation thereof, first lever arms 94 force lower ends 100 of second lever arms 98 outwardly such that the upper ends 104 thereof are pivoted inwardly to head clamps 106 into engagement with the head of the animal positioned therebetween.

A pair of U-shaped collars are slidably mounted upon each shaft 110 forwardly of clamp unit 56. Each collar 112 comprises a pair of spaced apart ears 114 interconnected by central web 116, with each ear 114 having an aperture therein through which shaft 110 extends. The pair of collars 112 are interconnected by a bar member 118 such that collars 112 are movable in unison along shafts 110. A friction block 112 is positioned between ears 114 on each collar 112 and has an arcuate inner surface adapted to frictionally engage shaft 110 and hold collar 112 in position thereon as hereinafter described.

A pair of vertically disposed legs 122 are slidably received between friction block 120 and central web 116 of collar 112. Legs 122 have upper ends 124. A jaw support member 126 extends between legs 122 and is pivotally supported at upper ends 124 thereof by set screws 128 extending through legs 122 and into jaw support member 126 at opposite ends thereof. Similar set screws 130 are threadably received in an opening in the central web 116 of each collar so as to frictionally engage legs 122 such that the vertical displacement of jaw support member 126 above shafts 110 can be adjusted. As set screws 130 are tightened to hold legs 122 in the desired position, legs 122 engage and force friction block 120 into frictional engagement with shafts 110, thereby preventing longitudinal movement of collars 112 along shaft 110. Jaw support member 126 has an opening 132 for receiving an endotracheal tube 133 for insertion into the animal's trachea.

An L-shaped bar member 134 having opposite ends 136 and 138 with slots 140 in each end thereof is slidably attached to crossbar 54 and bar member 118 at ends 136 and 138, respectively, by set screws 142 extending through slots 140 and into crossbar 154 and bar member 118. The tightening of set screws 142 locks cradle 52 against pivotal side to side movement about the vertical axis of screws 78 and further locks collars 112 against longitudinal movement along shafts 110.

In operation, animal 14 is moved into chute 12 such that the body of the animal is confined by the chute and the head of the animal is extending through opening 20 therein. The animal may be anesthetized after it is placed in the chute, in which case, the body of the animal is supported by slings 22. The animal's head is positioned in cradle 52 such that the rear portion of the head is adjacent clamp unit 56 with the mouth of the animal extending forwardly therefrom. Preferably, jaw support member 126 fits into the mouth of the animal and is pivoted about its longitudinal axis by loosening set screws 128 to provide a comfortable and natural fit therein. The space between clamp unit 56 and jaw support member 126 can be varied to accommodate various sized heads by loosening set screws 130 and sliding collars 112 along shafts 110. Also, the space between head restrainer 10 and chute 12 can be varied to accommodate different sized animals by the adjustment of the slotted plates provided in one or both of the bracket assemblies.

Head clamps 106 are tightened onto the jaw of the animal by turning handle 88 so that collar 90 moves downwardly on threaded shaft 86. Slotted strap brackets 144 are attached by set screws 145 to each side of clamp unit 56 and to jaw support member 126 such that straps 146 can be threaded through the slots in strap brackets 144 and wrapped around the animal's head to safely secure the head to cradle 52.

Once the animal's head is secured to cradle 52, the cradle can be manipulated in various directions to positon the head as needed for the work to be done thereon. For example, the head can be raised or lowered by moving both ends 58 and 60 of crossbar 54 upwardly or downwardly, respectively, along the bracket assemblies. Also, the head of the animal can be tilted to one side or the other by moving one end or the other of crossbar 54 upwardly or downwardly along the respective bracket assembly such that the entire cradle 52 is pivoted about a horizontal axis which is substantially parallel to the longitudinal axis of chute 12. Furthermore, the animal's head can be turned to one side or the other by loosening screw 78 and set screws 142 such that clamp unit 56 is pivotable about the vertical axis of screw 78. Finally, the animal's head can be tilted upwardly or downwardly by raising or lowering jaw support member 126 accordingly.

From the foregoing, it can be seen that at least all of the stated objectives are accomplished by the animal head restrainer of the present invention.

What is claimed is:

1. An animal head restrainer for holding the head of an animal confined in an elongated animal chute having forward and rearward ends and an opening in said forward end through which the head of the animal extends, said head restrainer comprising:
   a pair of bracket assemblies attached to said chute, one of said assemblies being attached on either side of said opening in said chute,
   a head cradle for holding the head of the animal and having forward and rearward ends and opposite sides and being connected at said rearward end to said bracket assembly in spaced relation to said chute,
   first adjustment means on said bracket assemblies for pivoting said cradle about a horizontal axis whereby the head of the animal is tiltable from side to side, said horizontal axis being substantially parallel with the longitudinal axis of said chute,
   second adjustment means on said cradle for pivoting a portion of said cradle about a vertical axis whereby the head of the animal is laterally movable from side to side, and
   third adjustment means on said cradle for tilting the head of the animal upwardly or downwardly from a horizontal plane.

2. The head restrainer of claim 1 wherein said first adjustment means connects said cradle to said bracket assemblies for selective vertical positioning of said cradle whereby the head of the animal is selectively raised and lowered.

3. The head restrainer of claim 1 wherein fourth adjustment means on said bracket assemblies selectively vary the space between said cradle and said chute whereby said head restrainer accommodates different size animals.

4. The head restrainer of claim 1 further comprising a plurality of straps attached to said cradle for securing the head of the animal to said head cradle.

5. The head restrainer of claim 1 wherein said cradle includes a crossbar adjustably connected at opposite ends thereof to said bracket assemblies, a head clamp unit pivotally connected to said crossbar intermediate said opposite ends thereof, a pair of spaced apart arms secured to said clamp unit and extending forwardly therefrom, and an elongated jaw support member slidably mounted upon said arms in perpendicular relation thereto.

6. The head restrainer of claim 5 wherein said clamp unit is movable between a first open position and a second head engaging position.

7. The head restrainer of claim 5 wherein said clamp unit includes a pair of pivotable arms each having a clamp member at one end thereof for receiving and holding the head of the animal therebetween.

8. The head restrainer of claim 5, wherein said jaw support member is positioned in the mouth of the animal between the upper and lower jaws thereof.

9. The head restrainer of claim 5 wherein said jaw support member has an aperture therethrough for receiving an endotracheal tube.

10. The head restrainer of claim 5 wherein pivot means connects said clamp unit to said crossbar whereby said clamp unit is pivotable about a vertical axis.

11. The head restrainer of claim 10 wherein first lock means on said cradle locks said clamp unit against pivotal movement about said vertical axis.

12. The head restrainer of claim 5 wherein collar means slidably mounted upon each of said arms support said jaw support member on said arms for slidable movement therealong.

13. The head restrainer of claim 12 wherein lock means on said cradle locks said jaw support against slidable movement along said arms.

14. The head restrainer of claim 12 wherein said jaw support member has vertically disposed legs, said collar means have apertures therein for slidably receiving said legs, and second lock means on said collar means locks said legs of said jaw support member against slidable movement through said apertures of said collar.

15. The head restrainer of claim 14 wherein pivot means connects said jaw support member at opposite ends thereof to said legs for pivotal movement of said jaw support member about the longitudinal axis thereof.

16. An animal head restrainer for holding the head of an animal restrained by a framework having an opening through which the head of the animal extends, comprising: a pair of spaced apart bracket assemblies connected to
   said framework on either side of said opening,
   a head cradle connected to said bracket assemblies in spaced relation to said framework for holding the head of an animal and having opposite sides and forward and rearward ends defining a longitudinal axis thereof,
   first means on said bracket assembly for tilting the head of the animal from side to side about a longitudinal horizontal axis;
   second means on said cradle for turning the head of the animal from side to side about a vertical axis; and
   third means on said cradle tilting the head of the animal upwardly or downwardly with respect to the body of the animal, said first, second and third means operating independently of one another for selective positioning of the animal's head.

17. The head restrainer of claim 16 wherein lock means on said cradle locks said cradle in a selected position.

18. The head restrainer of claim 16 wherein said cradle includes a crossbar adjustably connected at opposite ends thereof to said bracket assemblies such that said crossbar is pivotal about either end thereof, a head clamp unit having forward and rearward ends and being pivotally attached at said rearward end to said crossbar adjacent the midpoint thereof for lateral pivotal movement about said midpoint of said crossbar, a pair of horizontally disposed spaced apart arms connected to said head clamp unit and extending forwardly therefrom, and a jaw support member slidably attached to said pair of arms in adjustable spaced relation thereto.

19. The head restrainer of claim 18 wherein said clamp unit includes a pair of interconnected clamps mounted at the rearward end of said clamp unit for engaging opposite sides of the head of the animal.

20. The head restrainer of claim 19 wherein means connected to said clamps move said clamps from an open position to a closed head engaging position.

* * * * *